(12) United States Patent
Yeh

(10) Patent No.: US 7,638,889 B2
(45) Date of Patent: Dec. 29, 2009

(54) BAG/PACK POWER GENERATION DEVICE

(76) Inventor: Ming-Hsiang Yeh, 14F, No. 375, Nan-Gang District, Fu De Street, Taipei City (TW)

( * ) Notice: Subject to any disclaimer, the term of this patent is extended or adjusted under 35 U.S.C. 154(b) by 92 days.

(21) Appl. No.: 12/078,487

(22) Filed: Apr. 1, 2008

(65) Prior Publication Data

US 2009/0243303 A1  Oct. 1, 2009

(51) Int. Cl.
*F03G 7/00* (2006.01)
(52) U.S. Cl. .................. 290/1 A; 290/1 R; 290/1 C
(58) Field of Classification Search ............... 290/1 A, 290/1 R
See application file for complete search history.

(56) References Cited

U.S. PATENT DOCUMENTS

| | | | | |
|---|---|---|---|---|
| 337,973 | A * | 3/1886 | Monger | 74/132 |
| 566,198 | A * | 8/1896 | Livoni | 74/131 |
| 4,032,829 | A * | 6/1977 | Schenavar | 322/3 |
| 4,078,438 | A * | 3/1978 | Starbard | 74/34 |
| 6,982,497 | B2 * | 1/2006 | Rome | 290/1 A |
| 7,361,999 | B2 * | 4/2008 | Yeh | 290/1 R |
| 2009/0015022 | A1 * | 1/2009 | Rome et al. | 290/1 A |

* cited by examiner

*Primary Examiner*—Joseph Waks
(74) *Attorney, Agent, or Firm*—Rosenberg, Klein & Lee

(57) ABSTRACT

A bag/pack power generation device includes a power generation module, a generator, and a bag/pack. The power generation module includes first and second speed-up gear shafts and a rack. Each speed-up gear shaft includes a pinion and a gear mounted thereto. The pinion of the first speed-up gear shaft mates the rack. The gear of the first speed-up gear shaft mates the pinion of the second speed-up gear shaft. The gear of the second speed-up gear shaft is in operative coupling with the generator. The bag/pack has at least one strap comprised of strap segments and a buckle connecting between the strap segments. The buckle includes an outer frame and a central portion. The outer frame has an inner edge forming a toothed section. The central portion is coupled to the first and second speed-up gear shafts and the generator. As such, the power generation device is arranged on the strap and when the bag/pack is subjected to natural moving rhythm, the generator is operated to generate electrical power.

9 Claims, 5 Drawing Sheets

BAG/PACK POWER GENERATION DEVICE

FIELD OF THE INVENTION

The present invention relates to a bag/pack power generation device, and in particular to a power generation device that comprises a combination of a power generation module, a generator, and a bag/pack, and that uses up-and down natural rhythm caused by treading of a user wearing the bag/pack and the weight of the bag/pack, which causes movement of the bag/pack, to realize power generation and that is applicable to shoulder bag, a backpack, a side-carrying shoulder bag or the likes.

BACKGROUND OF THE INVENTION

When a user carries a portable electronic device, such as a mobile phone, a miniature radio, a walkman, and a digital player, the electronic device is often powered by batteries or primary or secondary cells. Thus, the user has to first check out the batteries or cells before he or she operates the device or gets out with the electronic device. Batteries or cells have only limited supply of power and once the power is used up, the electronic device cannot be further operated due to being out of supply of power. On the other hand, with the recognition of the importance for environmental protection by the modern people, cutting down the number of batteries or cells used is now the big trend for modern society, for all kinds of batteries or cell, such as the regular dry cells, mercury cells, or lithium cells, cause pollution to the environment.

Human power generation devices are thus suggested to preserve our environment. A conventional human power generation device is comprised of an air compressor, which compresses with the activity of a user, such as swing, impact, and gripping, a magnet set, which is rotated by the compressed air, an electromagnetic induction device in which time-variable voltage d is induced by an external time-variable magnetic field, a circuit system that converts an alternate current into a direct current and accumulates and uses electrical power, and an enclosure that houses the magnet set and the electromagnetic induction device.

Such a human power generation device can use the dynamic energy generated by the activity of a user to generate electrical power. However, such a device has a complicated structure composed of a great number of constituent parts. Also, purposed movement or motion, such as swing, contact, and gripping, has to be taken to realize power generation. All these are disadvantageous. To overcome such drawbacks, the present invention is aimed to provide bag/pack power generation device, which has a simple structure and uses the natural up-and-down rhythm of a bag or a pack caused by walking of a user that wears the bag or the pack to realize power generation.

SUMMARY OF THE INVENTION

An objective of the present invention is to provide a bag/pack power generation device, comprising a combination of a power generation module, a generator, and a bag/pack. The bag or pack has at least one strap and a buckle, which is in operative coupling with the power generation module and the generator so that when a user puts on the bag or pack and walks, the naturally generated up-and-down walking rhythm is used to case the operation of the generator for generating electrical power, whereby the user can continuously generate electrical power in an ignorant, nearly effortless, and resistance-free condition.

Another objective of the present invention is to provide a bag/pack power generation device, comprising a combination of a power generation module, a generator, and a bag/pack, whereby when the generator is put in operation due to for example walking of a user carrying the bag/pack, the generator continuously supplies electrical power to for example a portable electronic device and alternately charges the electrical power to for example a secondary cell for subsequent use.

To realize the above objectives, in accordance with the present invention, a bag/pack power generation device is provided, comprising a power generation module, a generator, and a bag/pack. The power generation module comprises first and second speed-up gear shafts and a rack. Each speed-up gear shaft comprises a pinion and a gear mounted thereto. The pinion of the first speed-up gear shaft mates the rack. The gear of the first speed-up gear shaft mates the pinion of the second speed-up gear shaft. The gear of the second speed-up gear shaft is in operative coupling with the generator. The bag/pack has at least one strap comprised of strap segments and a buckle connecting between the strap segments. The buckle includes an outer frame and a central portion. The outer frame has an inner edge forming a toothed section. The central portion is coupled to the first and second speed-up gear shafts and the generator. As such, the power generation device is arranged on the strap and when the bag/pack is subjected to natural moving rhythm, the generator is operated to generate electrical power.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
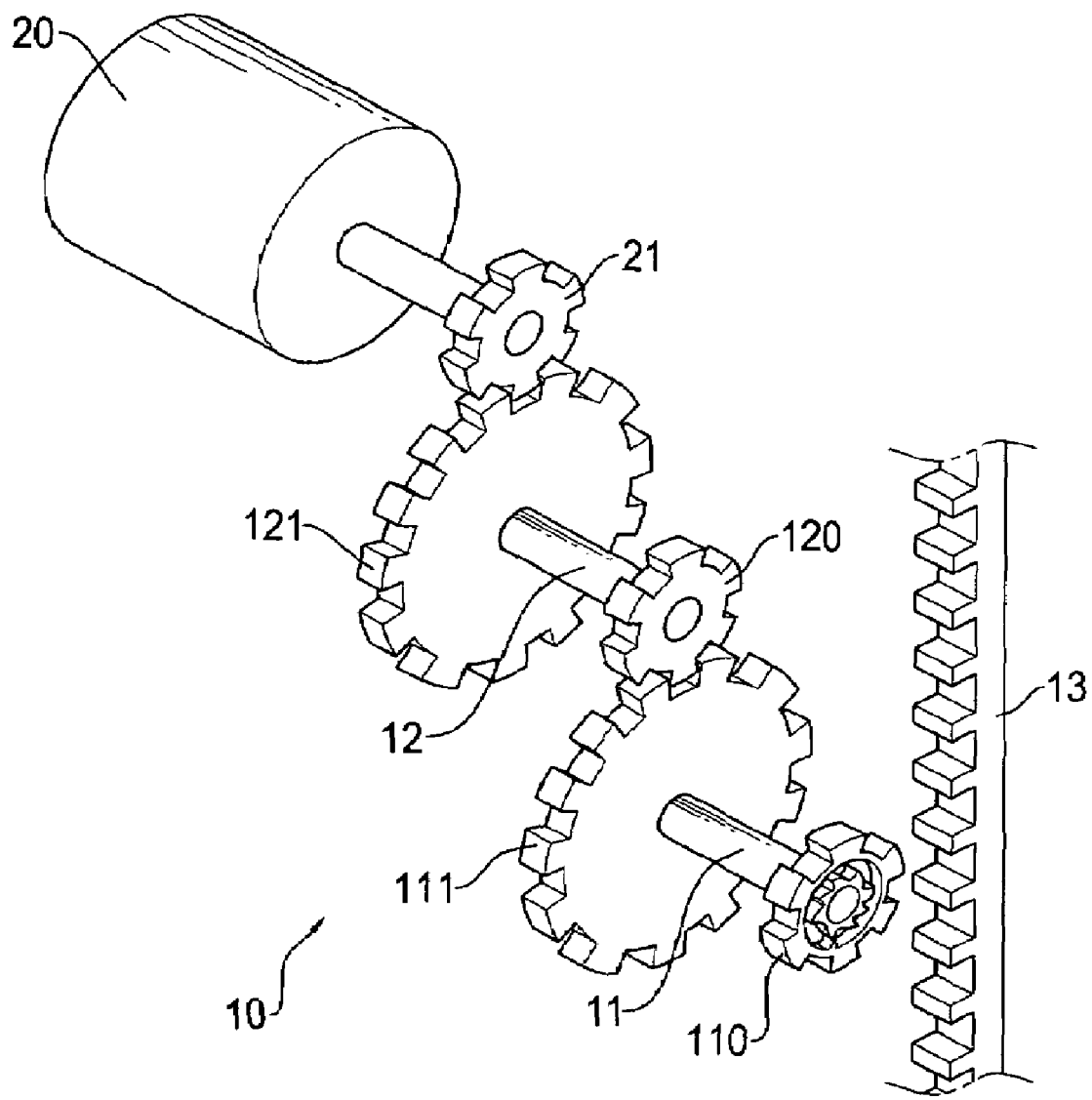
FIG. 1 is a perspective view schematically illustrating a power generation module and a generator that is embodied in accordance with the present invention.
Figure 2:
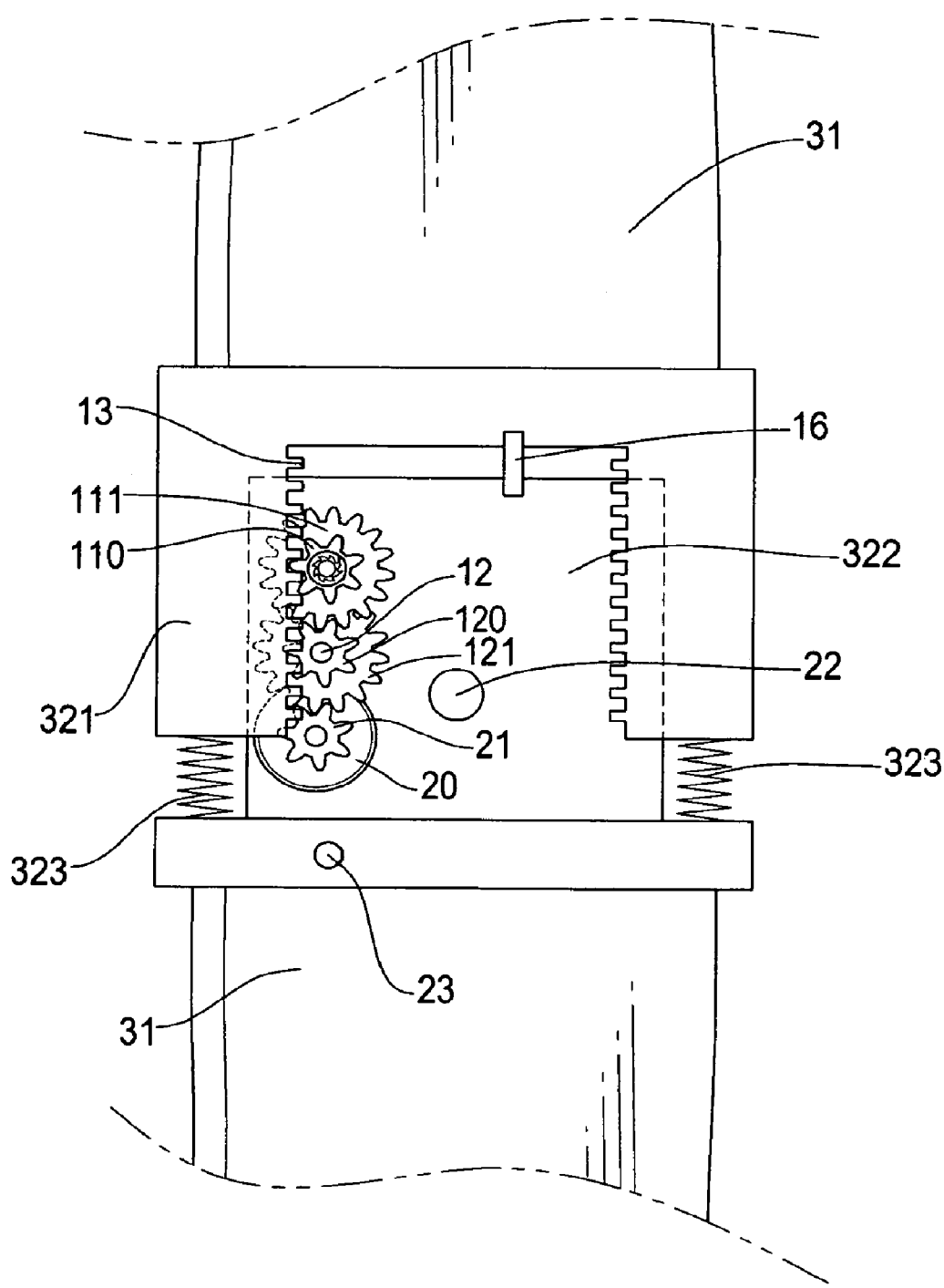
FIG. 2 is a schematic view illustrating a bag/pack power generation device in accordance with a first embodiment of the present invention.
Figure 3:
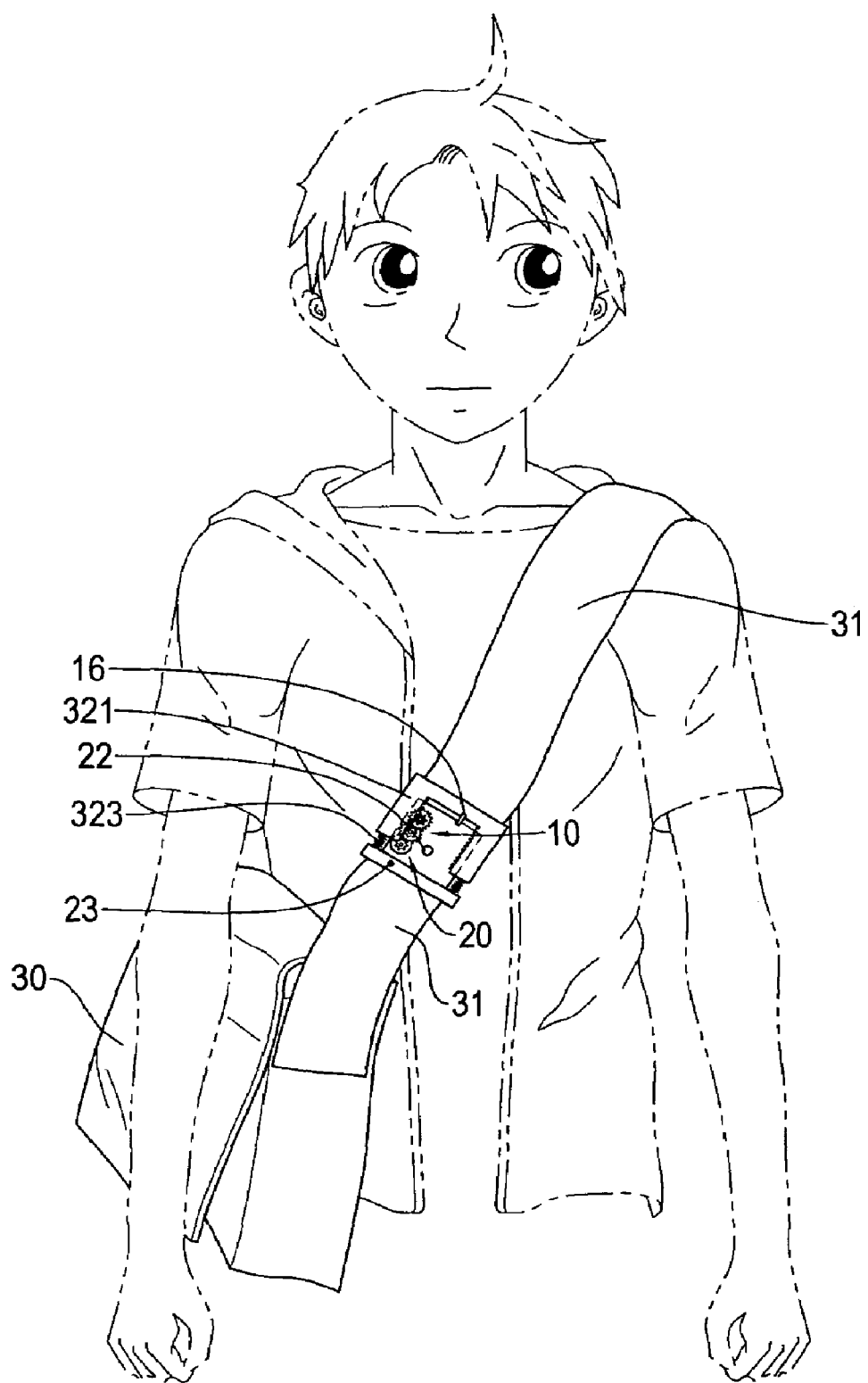
FIG. 3 is a schematic view showing an application of the bag/pack power generation device of the present invention.

With reference to the drawings and in particular to FIGS. 1-3, a pack/bag power generation device constructed in accordance with a preferred embodiment of the present invention comprises a power generation module 10, a generator 20, which can be for example a rotor-based generator, and a bag 30 (for example a shoulder bag). The power generation module 10 comprises two speed-up gear shafts 11, 12 and a rack 13. The first speed-up gear shaft 11 has a front end to which a one-way pinion 10 is mounted and a rear end to which a gear 111 is mounted. The second speed-up gear shaft 12 has front and rear ends to which a pinion 120 and a gear 121 are respectively mounted. The generator 20 has an axle to which an axle gear 21 is mounted. The one-way pinion 110 of the first speed-up gear shaft 11 mates the rack 13; while the gear 111 mates the pinion 120 of the second speed-up gear shaft 12. And, the gear 121 of the second speed-up gear shaft 12 mates the axle gear 21 of the generator 20. When the rack 13 moves upward, as viewed in FIG. 1, the rack 13 drives the one-way pinion 110 of the first speed-up gear shaft 11, and the gear 111 that is mounted to the rear end of the shaft 11 synchronously drives the pinion 120 of the second speed-up gear shaft 12. The gear 121 of the second speed-up gear shaft 12 synchronously drives the axle gear 21 mated therewith, to further drive the generator 20 to generate electrical power. The bag 30 encloses an interior receiving space and the bag 30 is connected to at least one band, which is comprised of strap segments 31 and a buckle 32. The buckle 32 comprises a U-shaped outer frame 321 and a central portion 322. The outer frame 321 has an inner edge that is serrated, forming a rack 13. An end of the outer frame 321 is fixed to one strap segment 31, preferably integrally fixed thereto. An opposite end of the outer frame 321 is connected to the central portion 322 by at least one spring 323 (two springs 323 being shown in the embodiment illustrated). At predetermined locations of the central portion 322, a locking member 16, the power generation module 10, the generator 20, a control knob 22 that controls if the generator 20 is to generate power, and a test indicator 23 that indicates the status of power generation. The outer frame 321 is arranged around an outer circumference of the central portion 322 and the rack 13 is made mating the one-way pinion 110 of the first speed-up gear shaft 11. The test indicator 23 is electrically connected to power output terminal of the generator 20. The power output terminal of the generator 20 is also connected to other electronic elements, such as a light-emitting diode. An end of the central portion 322 is fixed to the other strap segment 31 to complete the assembly of the strap to the bag 30.

When a user puts on the bag 30, but has no intention to generate power, the locking member 16 of the central portion 322 of the buckle 32 is secured to fix the outer frame 321 and the central portion 322 together as a regular buckle, in which condition the generator 20 does not operate and no power is generated. Once the locking member 16 of the central portion 322 is released from a counterpart of the outer frame 321, the outer frame 321 and the central portion 322 of the buckle 32 are allowed to move with respect to each other, whereby when the user treads or jogs, due to the gravity of an article that is received in the interior receiving space of the bag 30, the bag 30 jigs up and down and causes the central portion 322 that is fixed to the strap segment 31 to reciprocate up and down. In the embodiment illustrated, when the central portion 322 is in the course of downward movement (or the upward movement, if the central portion 322 and the outer frame 321 exchange with each other to allow the outer frame 321 to move downward), a relative movement occurs between the outer frame 321 and the central portion 322 and the rack 13 of the outer frame 321 drive the one-way pinion 110 of the central portion 322 to move so that the gear 111 of the same shaft as the one-way pinion 110 synchronously drives the pinion 120 of the second speed-up gear shaft 12 mated therewith, and the gear 121 of the second speed-up gear shaft 12 in turn drives the axle gear 21 of the generator 20. With the arrangement of the two speed-up gear shafts 11, 12, the natural rhythm of the user's treading drives a limited distance movement of the rack 13 and causes the generator 20 to generate power. In this condition, the test indicator 23 is lit, indicating the power generation module 10 is in operation to generate power in accordance with the naturally generated up-and-down rhythm of the user's treading. With the natural treading rhythm of the user, the springs 323 between the central portion 322 and the outer frame 321 cyclically generate spring forces that bring the central portion 322 back into the outer frame 321, in which condition, the gear 111 that is mounted on the same shaft as the one-way pinion 110 is not rotated and does not drive the pinion 120 of the second speed-up gear shaft 12. Thus, the up-and-down treading rhythm repeatedly and alternately sets the generator 20 in operation to generate electrical power.

Electronic devices/elements connected to the power output terminal of the generator 20 can be energized by the operation of the generator 20. Alternatively, a secondary cell or a power accumulator can be connected to the generator 20 to store the power provided by the generator 20 for subsequent use. In addition, in that condition that the outer frame 321 and the central portion 322 are not fixed together by the locking member 16, in order not to generate power, the control knob 22 can be operated to shut down the operation of the generator 20.

Figure 4:
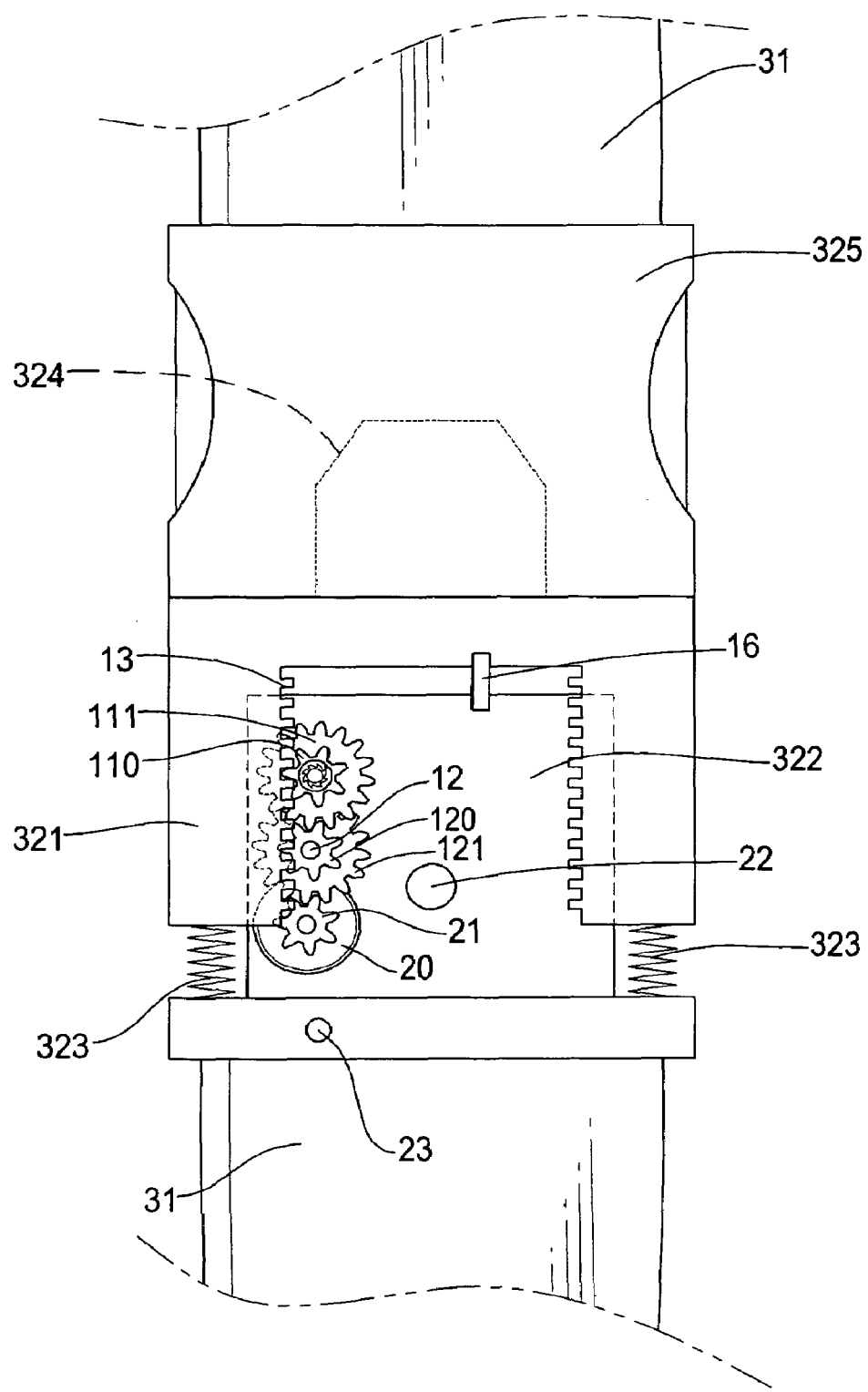
FIG. 4 is a schematic view illustrating a bag/pack power generation device in accordance with a second embodiment of the present invention.
Figure 5:
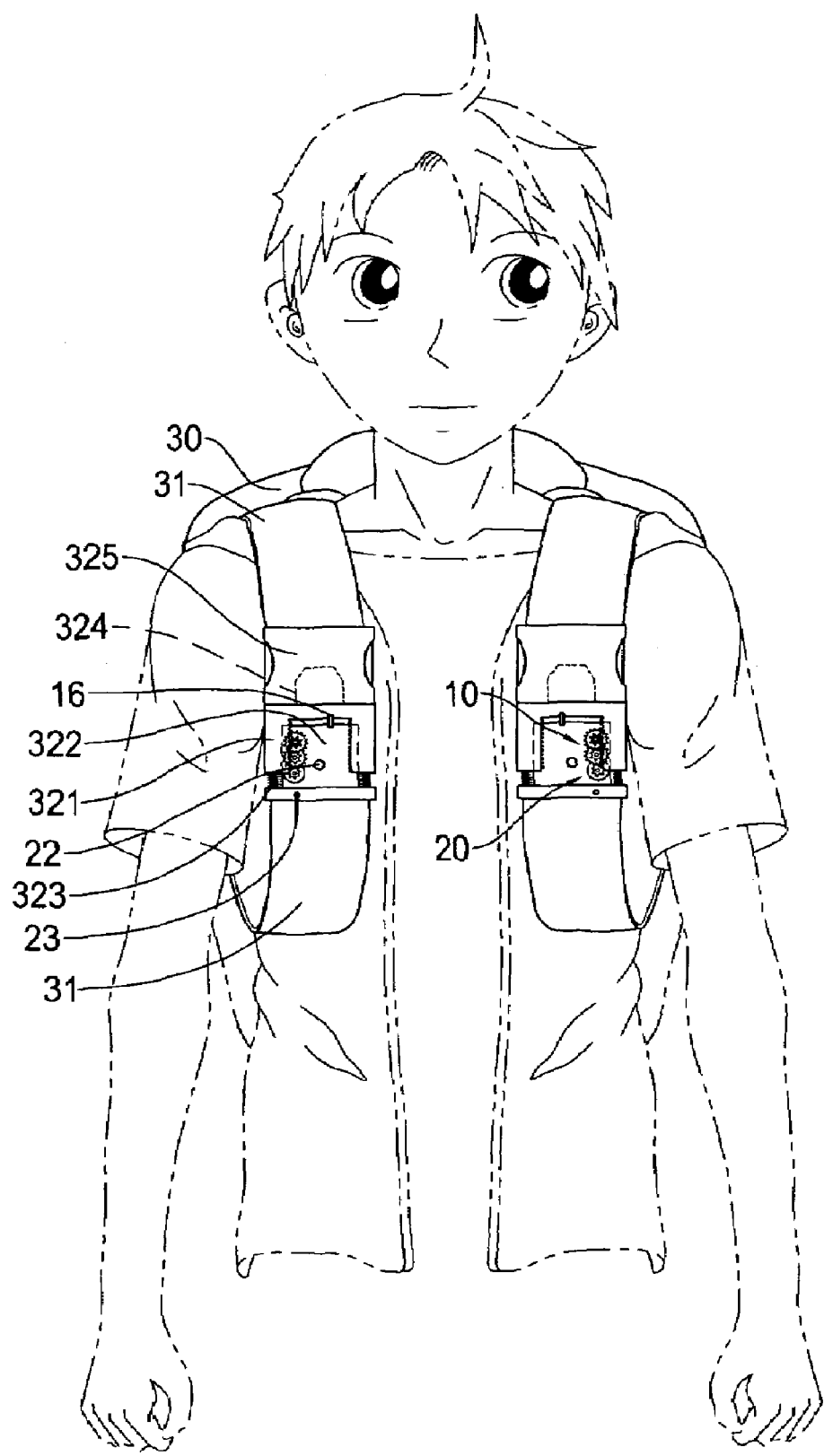
FIG. 5 is a schematic view showing an application of the bag/pack power generation device of the present invention.

Also referring to FIGS. 4 and 5, the bag 30 can be replaced by a backpack 30 that includes two shoulder straps, each having a buckle 32 that is coupled to the power generation module 10 and the generator 20. The buckle 32 is also comprised of an outer frame 32 and a central portion 322 and the outer frame 32 forms a male buckle member 324, which is engageable with a female buckle member 325 that is fixed to one strap segment 31 to thereby secure the shoulder strap and to allow easy and efficient release of the shoulder strap. When a user that puts on the backpack 30 is treading or jogging, the gravity force of an article received in the backpack 30 causes the backpack 30 to tremble, making the power generation module 10 and the generator 20 of each buckle 32 of the shoulder straps to induce dynamic energy that is converted into electrical power. Thus, the dynamic energy that occurs when the user treads or jogs is used to generate electrical power. Further, the power output terminal of the generator 20 is selectively connected to a step-up/step-down transformer or a charger. In addition, multiple sets of power generation module 10 and generator 20 can be used in combination to provide a large amount of electrical power.

Referring to FIGS. 1-5, the bag/pack power generation device in accordance with the present invention has the features that a combination of a power generation module 10, a generator 20, and a bag/pack 30 is used and the bag/pack 30 has at least one strap comprised of segments 31 connected by a buckle 32. The buckle 32 is comprised of an outer frame 321 and a central portion 322 to which a first speed-up gear shaft 11, a second speed-up gear shaft 12, and the generator 20 are operatively coupled so that when the central portion 322 of the strap segment 31 moves downward to drive the rotation of a one-way pinion 110 mounted on the first speed-up gear shaft 11, a gear 111 mounted to the same first speed-up gear shaft 11 drives a pinion 120 that is mounted to the second speed-up gear shaft 12 and mates the gear 111 and a gear 121 mounted to the second speed-up gear shaft 12 synchronously drives an axle gear 21 mating the gear 121 to operate the generator 20 for generating power. In this way, a user, in a completely ignorant condition, generates electrical power without any substantial extra effort and resistance. The outer frame 321 of the buckle 32 of each shoulder strap is provided with the male buckle member 324, which is engageable with a mated female buckle member 325 mounted to a strap segment 31, whereby releasing the backpack or bag is easy and convenient through manipulating the buckle. The power generated by the generator 20 can be used to power portable electronic devices or can be stored for subsequent use. As such, the present invention makes use of the up-and-down treading rhythm of a user to drive the generator 20 for generating electrical power, and the power generated by the generator 20 is selectively accumulated for further use, whereby practicability and convenience are enhanced.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bag/pack power generation device comprising a power generation module, a generator, and a bag/pack, wherein the power generation module comprises first and second speed-up gear shafts and a primary rack, each speed-up gear shaft comprising a pinion and a gear mounted thereto, the pinion of the first speed-up gear shaft mating the primary rack, the gear of the first speed-up gear shaft mating the pinion of the second speed-up gear shaft, the gear of the second speed-up gear shaft being in operative coupling with the generator, the bag/pack having an interior receiving space adapted to receive a weight therein, the bag/pack having at least one strap comprised of strap segments and a buckle connecting between the strap segments, the buckle comprising an outer frame and a central portion, the outer frame having an inner edge forming a secondary rack, the central portion being coupled to the first and second speed-up gear shafts and the generator and having a circumference surrounded by the outer frame, the secondary rack of the outer frame mating the pinion of the first speed-up gear shaft, the outer frame being connected to the central portion with at least one spring, whereby the device is arranged on the strap and when the bag/pack is subjected natural moving rhythm, the primary rack drives the second speed-up gear shaft to operate the generator for generating electrical power.

2. The bag/pack power generation device as claimed in claim 1, wherein the generator is a rotor based generator.

3. The bag/pack power generation device as claimed in claim 1, wherein the pinion of the first speed-up gear shaft of the power generation module comprises a one-way pinion.

4. The bag/pack power generation device as claimed in claim 1, wherein the generator comprises a control knob that controls if the generator is to generate power and a test indicator that indicates status of power generation.

5. The bag/pack power generation device as claimed in claim 1, wherein the generator has a power output terminal that is connectable to a step-up/step-down transformer.

6. The bag/pack power generation device as claimed in claim 1, wherein the generator has a power output terminal that is connectable to a charger.

7. The bag/pack power generation device as claimed in claim 1, wherein the generator has a power output terminal that is connectable to a power accumulator.

8. The bag/pack power generation device as claimed in claim 1, wherein the outer frame of the buckle is fixed to one strap segment.

9. The bag/pack power generation device as claimed in claim 1, wherein the outer frame of the buckle is mounted to a male buckle member that is engageable with a female buckle member mounted to one strap segment to secure the strap.

* * * * *